(12) United States Patent
Maddox

(10) Patent No.: US 6,903,682 B1
(45) Date of Patent: Jun. 7, 2005

(54) DGPS ANIMAL CONTAINMENT SYSTEM

(75) Inventor: Scott E. Maddox, Fort Wayne, IN (US)

(73) Assignee: Innotek, Inc., Garrett, IN (US)

( * ) Notice: Subject to any disclaimer, the term of this patent is extended or adjusted under 35 U.S.C. 154(b) by 0 days.

(21) Appl. No.: 10/758,616

(22) Filed: Jan. 14, 2004

(51) Int. Cl.$^7$ .............................................. H04B 7/185
(52) U.S. Cl. ........................... 342/357.06; 342/357.03; 342/357.04
(58) Field of Search .................... 342/357.01, 357.03, 342/357.04, 357.06, 357.08, 357.13

(56) References Cited

U.S. PATENT DOCUMENTS

| | | | |
|---|---|---|---|
| 5,868,100 A | 2/1999 | Marsh | 119/421 |
| 5,949,350 A | 9/1999 | Girard et al. | 340/825.49 |
| 5,963,130 A | 10/1999 | Schlager et al. | 340/540 |
| 6,043,748 A | 3/2000 | Touchton et al. | 340/573.3 |
| 6,070,673 A | 6/2000 | Wendte | 172/2 |
| 6,172,640 B1 | 1/2001 | Durst et al. | 342/357.07 |
| 6,232,880 B1 | 5/2001 | Anderson et al. | 340/573.3 |
| 6,232,916 B1 | 5/2001 | Grillo et al. | 342/357.07 |
| 6,236,358 B1 | 5/2001 | Durst et al. | 342/357.09 |
| 6,236,365 B1 | 5/2001 | LeBlanc et al. | 342/457 |
| 6,283,065 B1 | 9/2001 | Shorrock et al. | 119/863 |
| 6,456,938 B1 | 9/2002 | Barnard | 701/213 |
| 6,470,264 B2 | 10/2002 | Bide | 701/207 |
| 6,581,546 B1 | 6/2003 | Dalland et al. | 119/712 |
| 2002/0021231 A1 | 2/2002 | Schlager et al. | 340/984 |
| 2002/0073931 A1 | 6/2002 | Boesch et al. | 119/719 |
| 2002/0073933 A1 | 6/2002 | Oakman | 119/721 |
| 2002/0196151 A1 | 12/2002 | Troxler | 340/573.4 |

FOREIGN PATENT DOCUMENTS

JP 02000298430 A 10/2000

Primary Examiner—Dao Phan
(74) Attorney, Agent, or Firm—Taylor & Aust, P.C.

(57) ABSTRACT

An animal containment system includes a receiver unit carried by the animal. The receiver unit includes a GPS receiver for receiving satellite data; a memory for storing a plurality of waypoints defining a boundary, a stimulation circuit; and a processor coupled with the GPS receiver and the stimulation circuit. The processor activates the stimulation circuit at a distance from the boundary when the animal is within the boundary, dependent upon animal positional variables, and deactivates the stimulation circuit when the animal is outside the boundary.

15 Claims, 2 Drawing Sheets

DGPS ANIMAL CONTAINMENT SYSTEM

BACKGROUND OF THE INVENTION

1. Field of the Invention

The present invention relates to animal containment systems, and, more particularly, to DGPS animal containment systems using a collar mounted receiver unit.

2. Description of the Related Art

Conventional and electric fencing is commonly used to control the location of animals. Barrier fencing, which physically blocks the movement of the animal is most frequently used to confine both domestic pets and farm animals. Physical electric fencing, which uses an electric shock to discourage contact with the fence, is typically used to confine commercial livestock. The purpose of an electric fence is to keep farm animals within an area, or to prevent undesired animals from entering the property. High voltage electrical impulses are applied to a "live" fence wire by an energizer. This impulse lasts only thousandths of a second but is repeated every second or so. An animal, which strays into contact with the live wire, completes a circuit between the live wire and the soil. The result is an electric shock sufficiently unpleasant to cause the animal to move rapidly away from the fence before the next electrical impulse. After a few encounters, animals learn not to touch the live wire or approach the fence too closely.

Electronic animal control systems are known in which a radio frequency receiver collar is attached to an animal to limit the movement of the animal to a predetermined area of confinement. The predetermined area is configured through the physical arrangement of a subterranean transmission antenna which transmits a unique electromagnetic signal produced by an operably linked transmitting device. The transmission pattern of the subterranean antenna creates zones of transmission or area "boundaries" in which the attached animal receiver collar is responsive to the uniquely transmitted electromagnetic signal. Upon entering a predetermined limit area, the receiver collar detects the unique electromagnetic signal and, in response, delivers a correction stimulus, such as a mild shock or audible signal, to the animal. The effect of the repeated stimulus teaches the animal, such as a dog, to avoid the limit areas thus confining the animal without use of physical fences or barriers.

Underground pet containment systems have been largely successful in removing unsightly physical structures from the landscape. However, unlike physical barrier systems they are not easily reconfigured. The installation of a subterranean transmission antenna requires excavation of the boundary area. This excavation can be further complicated in areas having immovable objects such as trees or in geographical areas subject to extreme weather conditions, such as areas in which the earth is frozen for extended durations of time. Additionally, excavation entails the disruption of plant root systems, damaging surrounding crops, grass, flower beds, or trees. As such, present underground systems are generally permanent to the property in which they are originally installed. Homeowners who relocate are often forced to purchase a second system rather than excavating and salvaging an old system.

Other animal containment systems using GPS technology are also known. For example, U.S. Pat. No. 6,043,748 (Touchton, et al.) discloses a GPS animal containment system having a receiver unit with a transceiver which receives GPS signals and retransmits the signals indicative of the location of the animal to a base station located in the home of the pet owner. The base station includes suitable processing circuitry for calculating the position of the animal within the containment area. The base station transmits a signal to the receiver unit worn by the animal for the application of a stimulus to the animal when the animal is approaching too close to the boundary.

What is needed in the art is a GPS animal containment system which succinctly applies stimulation to the animal based upon location and movement characteristics of the animal at any given point in time within the containment area.

SUMMARY OF THE INVENTION

The present invention provides a GPS based animal containment system which activates the stimulation circuit dependent upon animal positional variables such as a distance from a boundary, a speed of travel within the boundary, an acceleration of travel within the boundary, and a direction of travel within the boundary.

The invention comprises, in one form thereof, an animal containment system including a receiver unit carried by the animal. The receiver unit includes a GPS receiver for receiving satellite data; a memory for storing a plurality of waypoints defining a boundary, a stimulation circuit; and a processor coupled with the GPS receiver and the stimulation circuit. The processor activates the stimulation circuit at a variable distance from the boundary, dependent upon animal positional variables when the animal is within the boundary, and deactivates the stimulation circuit when the animal is outside the boundary.

An advantage of the present invention is that all correction occurs within a defined boundary.

Another advantage is that different animal positional variables may be used to activate the stimulation circuit, depending upon the application.

Yet another advantage is that a DGPS may be used to increase the precision of the system.

A further advantage is that different stimulation levels can be applied to the animal, such as a "rising stimulation" technique.

A further advantage is that the system can be programmed to allow the animal to reenter the defined area without having stimulation applied. This will provide for adaptive correction based on the speed and proximity to the boundary to more effectively contain the animal.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
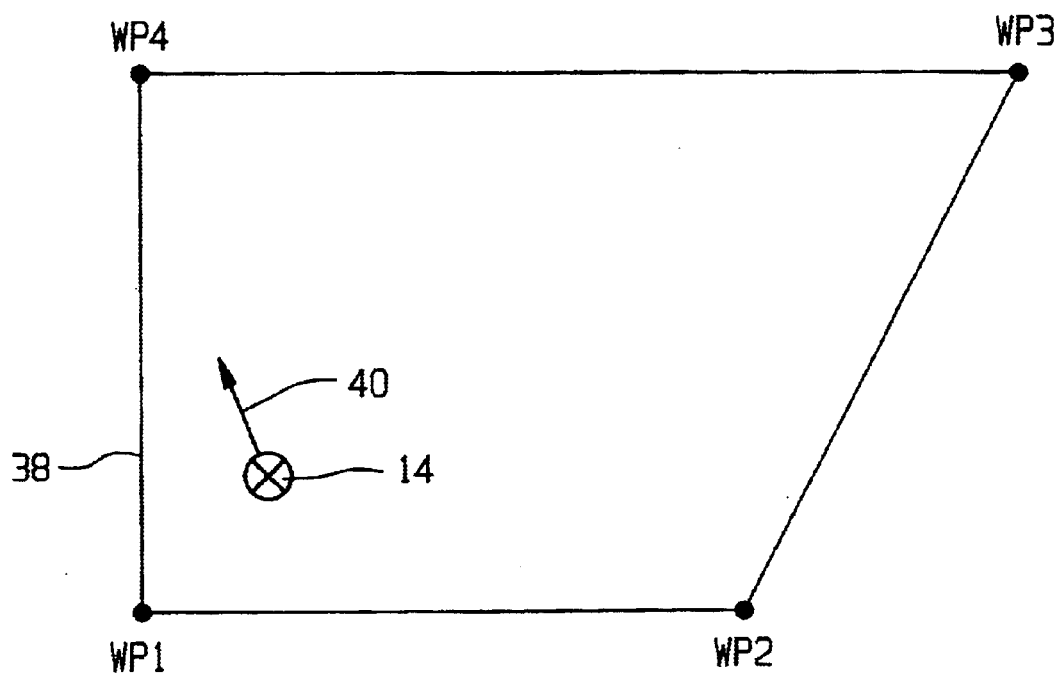
FIG. 1 is a schematic representation of an animal containment system of the present invention.
Figure 4:
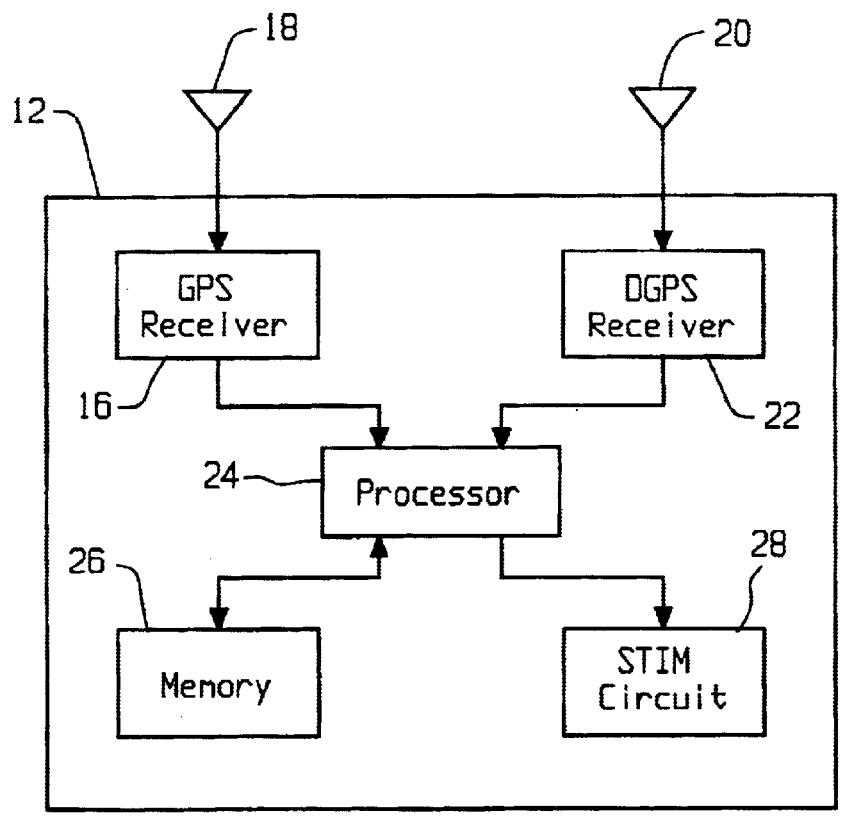
FIG. 4 is an electrical schematic of the receiver unit carried by the animal.

Referring now to the drawings, and more particularly to FIGS. 1 and 4, there is shown an embodiment of an animal containment system 10 of the present invention. Animal containment system 10, in the embodiment shown, is in the form of a receiver unit 12 which is carried by an animal 14, represented schematically in FIG. 1. Further, in the embodiment shown, animal 14 is in the form of a dog which is maintained within a confinement area such as a yard of the pet owner. Receiver unit 12 is preferably mounted to a collar worn by the dog but may be carried in other suitable ways, such as a harness, etc, depending upon the application.

Receiver unit 12 includes a GPS receiver 16 which receives GPS satellite data from GPS antenna 18. Receiver unit 12 also receives differential GPS signals by an appropriate source (e.g., WAAS and/or cell phone tower signal) which improves the accuracy and precision of the GPS system. More particularly, the DGPS signals are received at DGPS antenna 20 and DGPS receiver 22. The data from the GPS receiver and DGPS receiver are utilized by processor 24 and/or stored within memory 26 for subsequent use by processor 24. Processor 24 activates stimulation circuit 28, as will be described in further detail hereinafter. Stim circuit 28 applies an electrical stimulus to animal 14 in the embodiment shown, but may apply other types of stimuli to the animal, such as sound, smell and/or mechanical stimuli.

Stim circuit 28 is preferably configured to apply multiple stimulation levels to the animal, depending upon the input signal received from processor 24. For example, depending upon the variables associated with the approach of the animal to the boundary of the containment system, stim circuit 28 can be configured to apply sequentially rising stimulation levels to the skin of the animal to deter the animal from leaving the boundary.

Figure 3:
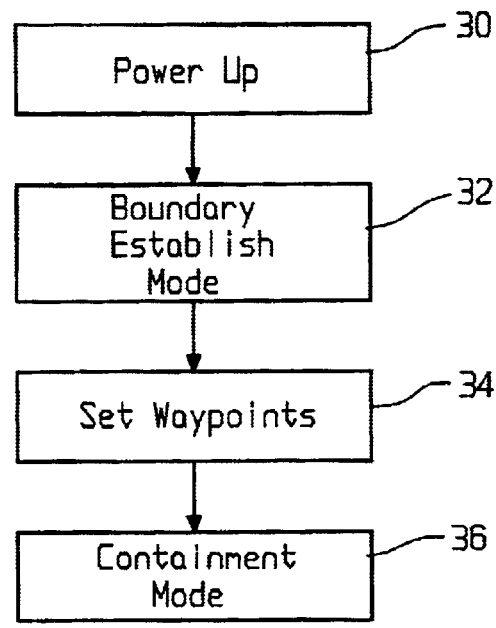
FIG. 3 is a flow chart illustrating the basic setup and operation of the animal containment system of the present invention.

Referring now to FIG. 3, the general operation of receiver unit 12 will be described in further detail. Initially, power is applied to receiver unit 12 (block 30). For an initial setup, a user places receiver unit 12 in a boundary establish mode (block 32) and walks with receiver unit 12 to each way point (identified WP1–WP4 in FIG. 1). The way points are stored in memory 26 for long-term use. It will be noted that the shape of the area in which animal 14 is to be contained can be any desired shape identified by way points marked by the user (block 34). Receiver unit 12 is then placed in a containment mode in which animal 14 may move about freely within the containment area, and receives a stimulus when approaching too close to the boundary defined by the way points (block 36). The logic utilized by processor 24 when receiver unit 12 is in the containment mode 36 will be described in more detail hereinafter.

With a conventional GPS containment system, a boundary is established using a way point as described above. The boundary acts as a fixed area, outside of which stimulation is applied to the animal to encourage the animal to return to the containment zone. Alternatively, if more than one stimulation level is to be applied to the animal, way points may be used for a fixed outer boundary and a second, fixed inner boundary is established at a pre-determined distance from the outer boundary. Since the pre-determined distance remains the same about the periphery of the containment area, the setoff distance defined by the inner boundary defines an area in which a different type of stimulus may be applied to animal 14. For example, a tone may be applied when the animal reaches the inner boundary and an electrical stimulation may be applied when the animal reaches the outer boundary.

In contrast, processor 24 within receiver unit 12 of the present invention uses one or more animal positional variables associated with the location and movement of the animal within a boundary 38 defined by waypoints. These animal positional variables are entirely dependent upon the location and movement characteristics of the animal at any given point in time within the boundary of the containment area, and thus not constant within the boundary. For example, animal 14 may approach the boundary at a walk substantially head-on on one side of the boundary and approach the boundary on another side at a run and an acute angle. The present invention therefore does not define an inner area at a constant setoff distance from the boundary, but rather uses a variable distance which may change at any given point in time dependent on speed and angle of approach to the boundary.

In the embodiment shown, the animal positional variables which are utilized by processor 24 include a distance from boundary 38, a speed of travel within boundary 38, an acceleration of travel within boundary 38, and a direction of travel within boundary 38.

Figure 2:
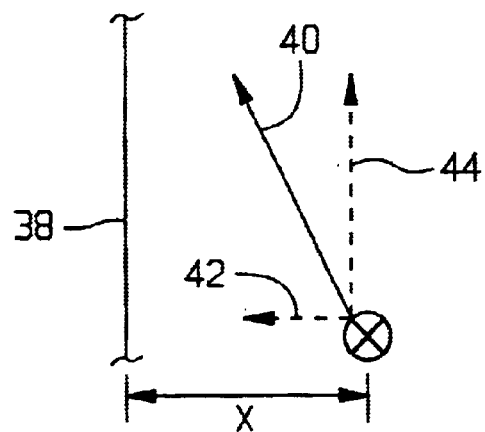
FIG. 2 is a schematic representation of location and movement of an animal within a containment area.

For example, referring to FIG. 2, animal 14 is assumed to be moving relative to the boundary defined between waypoint 1 and waypoint 4 at a direction of travel and speed of travel indicated by vector 40. Vector 40 may be broken into it's component vectors, including vector 42 which is orthogonal to boundary 38 and a vector 44 which is parallel to boundary 38. Using the location of animal 14 calculated from the GPS signals and DGPS signals, a distance X in an orthogonal direction between animal 14 and boundary 38 may be calculated. Knowing the location of animal 14 and component velocity vector 42, an estimated time of arrival to boundary 38 can then be calculated. Thus, dependent upon the location of animal 14 and the speed and direction of travel of animal 14, the desired stimulus may be applied if the animal is approaching too close.

In one embodiment, the initial stimulus may range in intensity depending on the speed at which the animal is approaching the boundary. For example, if the animal is approaching slowly, a warning tone may be used. If the animal continues to approach the boundary a low level stimulation may be applied. If the animal continues to approach the stimulation may be increased. Conversely, if the animal is rapidly approaching the boundary a high level stimulation may be applied immediately.

In the event that animal 14 disregards the applied stimulus and crosses boundary 38, receiver unit 12 may be configured to temporarily deactivate stim circuit 28 so that animal 14 may re-enter without being shocked.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within limits of the appended claims.

What is claimed is:

1. An animal containment system including a receiver unit carried by the animal, said receiver unit comprising:
   a GPS receiver for receiving satellite data;
   a memory for storing a plurality of waypoints defining a boundary;
   a stimulation circuit; and
   a processor coupled with said GPS receiver and said stimulation circuit, said processor activating said stimulation circuit at a distance from boundary, dependent upon animal positional variable when the animal is within said boundary, said stimulation being applied based on a speed of travel of the animal within said boundary.

2. The animal containment system of claim 1, wherein said animal positional variables is an acceleration of travel within said boundary.

3. The animal containment system of claim 2, wherein said stimulation circuit is configured to apply multiple stimulation levels, and said processor activates said stimulation circuit using said multiple stimulation levels.

4. The animal containment system of claim 1, wherein said stimulation circuit is an electrical stimulation circuit.

5. The animal containment system of claim 1, wherein said processor deactivates said stimulation circuit when the animal is outside said boundary.

6. The animal containment system of claim 1, wherein said processor defines said boundary dependent upon said stored waypoints.

7. The animal containment system of claim 1, further including DGPS receiver for receiving differential signals, said processor coupled with said DGPS receiver.

8. The animal containment system of claim 1, wherein said processor activates said stimulation circuit at a variable distance from said boundary.

9. A method of containing an animal within a defined area, comprising the steps of:
   providing a receiver unit carried by the animal, said receiver unit including a GPS receiver for receiving satellite data; a memory; a stimulation circuit; and a processor coupled with said GPS receiver and said stimulation circuit;
   storing a plurality of waypoints defining a boundary in said memory; and
   activating said stimulation circuit at a distance from said boundary, dependent upon animal positional variables when the animal is within said boundary, said stimulation being applied based on a speed of travel of the animal within said boundary.

10. The method of containing an animal of claim 9, wherein said stimulation circuit is activated at a variable distance from said boundary.

11. The method of containing an animal of claim 10, including the step of applying multiple stimulation levels using said stimulation circuit.

12. The method of containing an animal of claim 9, wherein said stimulation circuit is an electrical stimulation circuit.

13. The method of containing an animal of claim 9, including the step of deactivating said stimulation circuit when the animal is outside said boundary.

14. The method of containing an animal of claim 9, wherein said processor defines said boundary dependent upon said stored waypoints.

15. The method of containing an animal of claim 9, including the step of allowing the animal to reenter said area without activating said stimulation circuit after the animal has exited said area.

* * * * *

UNITED STATES PATENT AND TRADEMARK OFFICE
CERTIFICATE OF CORRECTION

PATENT NO. : 6,903,682 B1
DATED : June 7, 2005
INVENTOR(S) : Maddox

It is certified that error appears in the above-identified patent and that said Letters Patent is hereby corrected as shown below:

Column 5,
Line 11, delete "variable", and substitute -- variables --.

Signed and Sealed this

Twenty-fourth Day of January, 2006

JON W. DUDAS
*Director of the United States Patent and Trademark Office*